Feb. 1, 1966    A. J. STOCK, ET AL    3,232,482
PORTABLE CLEANING APPARATUS
Filed Aug. 1, 1963
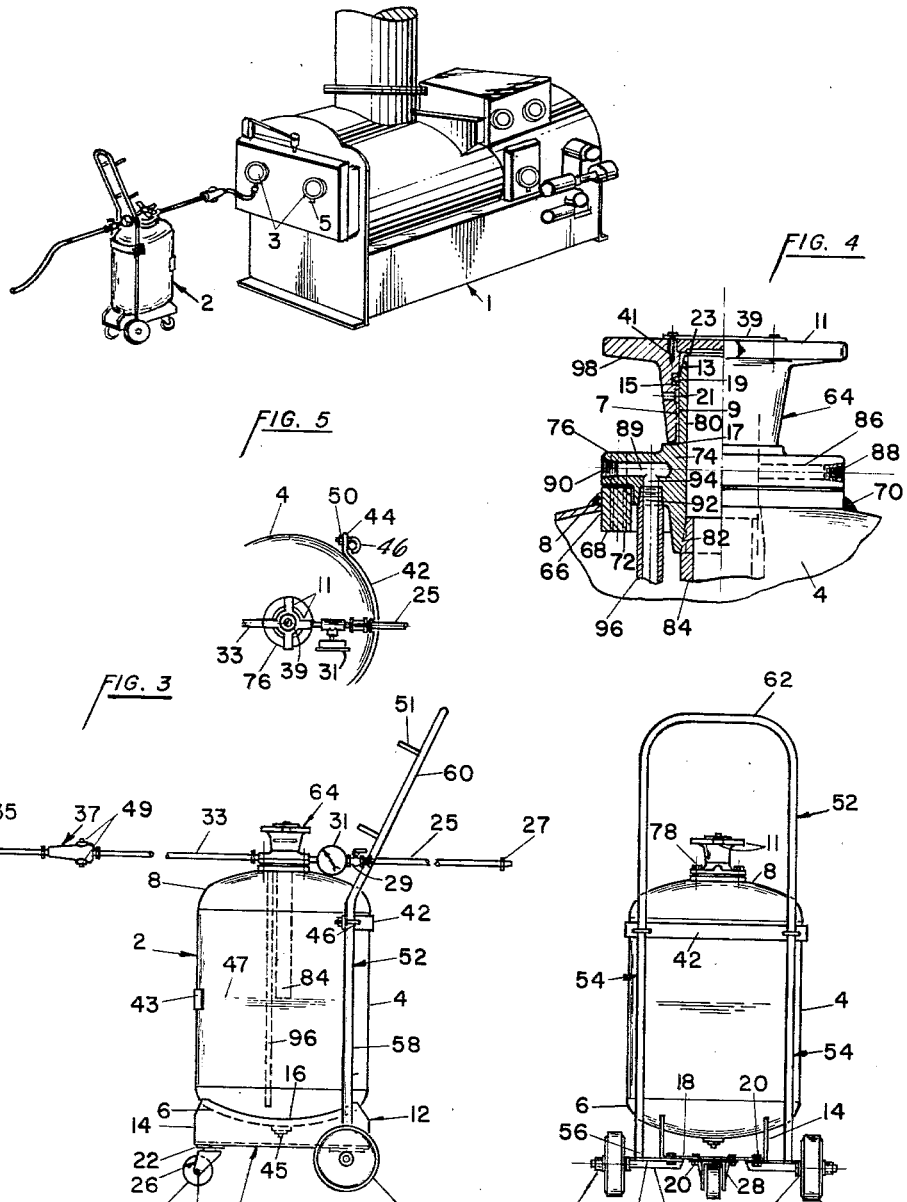
INVENTOR.
ARTHUR J. STOCK
KEITH E. SMITH
CHARLES A. CRABIEL
BY  STEVENS, DAVIS, MILLER & MOSHER
ATTORNEYS United States Patent Office 3,232,482
Patented Feb. 1, 1966

3,232,482
PORTABLE CLEANING APPARATUS
Arthur J. Stock, Lakewood, Ohio (731 Hanna Bldg., Cleveland, Ohio); Keith E. Smith, 12835 Caves Road, Chesterland, Ohio; and Charles A. Crabiel, 124 E. Aurora Road, Northfield, Ohio
Filed Aug. 1, 1963, Ser. No. 299,345
2 Claims. (Cl. 222—4)

The present invention relates, generally, to an apparatus for cleaning the visualizing means of an apparatus for feeding materials, such as coal. More particularly, this invention pertains to an apparatus particularly adapted to the cleaning or washing of a visualizing means comprising a component part of an apparatus for feeding a material such as coal during the normal operation thereof, said visualizing means frequently being or becoming coated with a layer of such material in pulverulent or granular form due to the passing thereof through said feeding apparatus.

In certain industrial applications, it is desired that a material be delivered to a chosen point of use at a controlled or known rate of delivery. For example, coal is fed from a hopper or bunker having an open bottom to an apparatus, which may be either a feeder of the gravimetric or volumetric type or a batch type coal scale, to steam boilers. Considering the gravimetric type of feeder or apparatus, for example, successive batches of material are accurately weighed out over a predetermined time period for weighing cycle. The weighed out batches are then distributed over a time period equal to the weighing cycle. To accomplish this, known constructions of gravimetric-type feeders are generally either of a weigh belt type, wherein material on a continuously moving belt is weighed as the belt moves over a scale, or of the loss-in-weight type. The latter type includes a hopper and feeder mechanism which is scale mounted. A scale poise is actuated along a weighing, or scale, beam, through a suitable motor drive mechanism, at a predetermined rate. The rate at which the material is fed from the hopper and feeder mechanism is regulated to maintain the scale in balance.

As the material, and especially coal, is processed through the feeder or scale, a coal dust is formed. It is well known to provide a visualizing means, such as windows comprising a transparent material, whereby an operator may frequently visualize the operation of the feeder. Notwithstanding the provision of such a visualizing means, an operator is often unable to visually determine the internal operation of the feeder or scale due to the accumulation of coal dust upon the visualizing means. This problem is particularly accentuated since the feeder generally is constructed to preclude access to the interior thereof for cleaning purposes.

Accordingly, one of the primary objects of the present invention is to provide an apparatus particularly adapted to the washing and/or cleaning of the visualizing means of an apparatus for feeding a material, such as coal. More specifically, a primary object of this invention is to provide an apparatus particularly adapted to the washing and/or cleaning of the visualizing means of a material feeder, said apparatus comprising a portable cleaning implement and be particularly adapted to be selectively connected to suitable fittings of said visualizing means, and the dispensing of a suitable cleaning fluid or fluids thereto, whereby the interior surface thereof may be cleaned free of coal dust.

A further primary object of the present invention is to provide an apparatus particularly adapted to the washing and/or cleaning of the visualizing means of a material feeder, said apparatus being readily and manually propelled from one position to another and being so constituted and arranged as to facilitate the connection thereof to suitable fittings of the visualizing means.

Still a further primary object of the present invention is to provide an apparatus which is so constituted and arranged as to facilitate the dispensing therefrom of a cleaning liquid and/or a cleaning or drying gas to the visualizing means of said material feeder.

An additional and still further primary object of the present invention is to provide an apparatus particularly adapted to the washing and/or cleaning of the visualizing means of a material feeder, said apparatus being so constituted and arranged as to render the dispensing therefrom of a cleaning liquid or a cleaning liquid and a drying fluid unusually efficient and easily accomplished. A still further primary object of the present invention is to provide a portable cleaning apparatus that is so constituted and arranged as to preclude harmful effects upon an operator by the release of excessive pressures.

Furthermore, it is a primary object of this invention to provide a method and apparatus particularly adapted to the washing and/or cleaning of the visualizing means of a material feeder, said apparatus being so constituted and arranged as to unusually efficiently dispense a cleaning or washing liquid and a drying fluid, such as a pressurized gas, subsequent thereto, whereby the tendency of coal dust to adhere to the interior surface of the visualizing means as a result of the application thereto of the cleaning liquid is precluded and the visualizing means is effectively rendered free of coal dust.

The invention lies in the combination, construction, arrangement, and disposition of the various components and means incorporated in a portable cleaning apparatus constructed in accordance herewith. The present invention will be better understood and objects other than those specifically set forth above will become apparent when consideration is given to the following detailed description. Such description refers to the annexed drawings, presenting one preferred and illustrative embodiment of the invention and wherein:

FIGURE 1 is a side elevational view of a portable cleaning apparatus constructed in accordance with the present invention, and illustrating certain component parts in phantom;

FIGURE 2 is a rear elevational view of the portable cleaning apparatus illustrated in FIGURE 1;

FIGURE 3 is a partial plan view of the portable cleaning apparatus illustrated in FIGURES 1 and 2;

FIGURE 4 is a detailed view, partially in section and partially in elevation, drawn to an enlarged scale, of certain component parts and elements of the portable cleaning apparatus illustrated in FIGURES 1 to 3; and, FIGURE 5 is a perspective view illustrating a portable cleaning implement or apparatus, such as that illustrated in FIGURES 1 to 4, structurally operatively associated with an apparatus for feeding a material, such as coal.

It is to be understood that terminology such as "cleaning fluids," as used in this description and the appended claims, is to be construed and interpreted in its broadest sense. In particular, such terminology is intended and should be interpreted to include such cleaning fluids as a cleaning liquid that performs the function of cleaning and/or washing. Additionally, such terminology is intended and should be interpreted to include a cleaning fluid, such as a drying fluid or gas, which is capable of performing the function of drying the visualizing means of a material feeder subsequent to the application thereto of a cleaning liquid, and is also capable of performing a cleaning function, in that such drying fluid is capable of blowing dust, or sediment or residue from such visualizing means.

Reference is now made more specifically to the drawings for purposes of explaining the detailed aspects of the instant development.

With reference first to FIGURE 5, there is illustrated therein an apparatus for feeding various materials, such as coal, from a hopper or bunker to a desired point of use, which may be of any suitable and well known construction, such as a gravimetric or volumetric type of feeder, generally designated by the reference character 1. The feeder 1 comprises a visualizing means 3, such as windows fabricated of any suitable transparent or translucent material, through which the internal operation of the feeder may be visualized by an operator. Male fittings 5 extend outwardly of the visualizing means 3, and are particularly adapted to be mutually cooperatively engageable with a portable cleaning apparatus constructed in accordance with the present invention. The fittings 5 may be provided with suitable valving (not shown), of any well known construction, to preclude ingress of air to the feeder 1 during the normal operation thereof, or to prevent the escape of pressure therefrom, depending upon the pressure existing within the feeder. Thus, should a positive interior pressure exist within the feeder, the fittings 5 may be provided with a check valve to preclude the escape of pressure from within the feeder. Or, should a slight suction exist within the feeder, during the normal operation thereof, the fittings 5 may be provided with a spring loaded valve, so that the ingress of air to the feeder during the normal operation thereof is precluded. Additionally, the fittings are so constituted and arranged as to provide a fluid passageway to that side of the visualizing means 3 facing interiorly of the feeder 1, whereby to wash or clean the visualizing means from an accumulation of coal dust.

With reference now to the remaining figures of the drawings, a portable cleaning implement or apparatus, constructed in accordance with the present invention, generally designated by the reference character 2, and particularly adapted to carry out the method developed in accordance herewith, is illustrated therein. The apparatus 2 comprises a tank or container 4, of any suitable configuration, particularly adapted to be filled with and dispense a suitable cleaning or washing fluid or fluids. Preferably, the tank or container is of generally cylindrical configuration, having a semi-spherical or concave (when viewed interiorly) lower or bottom end or wall 6 and a semi-spherical or convex (when viewed interiorly) upper or top end or wall 8. Further, the apparatus 2 comprises a cart or carriage, generally designated by the reference character 10, upon which the container is fixedly and removably positioned or secured. The cart 10 may be of the self-propelled type, but as shown, is of the manually propelled type. To the end of fixedly and removably positioning the container 2 upon the cart, the latter comprises a bracket, generally designated by the reference character 12, which bracket comprises, in turn, a plurality of upstanding or generally vertically extending or disposed legs 14 having a curvilinear surface 16 of substantially the same configuration and rate of curvature as the bottom end or wall 6 of the container. It is considered readily apparent that, inherently the mutual cooperative engagement between the bottom wall 6 of the container and the curvilinear surface 16 of each of the legs 14 fixedly and yet removably positions the tank upon the cart 10. This is important since it is desired that the tank 4 be replaceable when the cleaning fluid or fluids therewithin has been expended, should it be desired to replenish cleaning fluid in that manner. Additionally, it is desirable that the tank 4 be replaceable when certain component parts structurally associated therewith require repair. An alternative manner of replenishing cleaning fluid will be fully described hereinafter.

The bracket 12 comprises, further, a generally horizontally disposed leg 18 integral with the upstanding legs 14. This leg 18 is fixedly connected, in any suitable manner, by a connecting means such as conventional screw-bolt-and-nut arrangements, designated by the reference character 20, to a frontally disposed or positioned mounting plate 22, the latter comprising a component part of the cart or carriage 10. A frontally disposed pivotable wheel 24, positioned along the longitudinal axis of the cart 10, and comprising a component part thereof, is provided. While only one wheel is shown, it is to be understood that as many wheels as desired may be used. To the end of pivotably mounting or positioning the wheel 24 upon the cart 10, a wheel housing, generally designated by the reference character 26 is provided, connected to the mounting plate 22, in any suitable manner. The housing 26 comprises a plurality, and, as shown, two generally vertically or downwardly extending legs 28, of generally triangular configuration, as illustrated in FIGURE 1. The wheel 24 is rotatably journalled with respect to the housing 26, as by means of a shaft 30. The cart or carriage 10 is further comprised of a plurality, and, as shown, two rearwardly disposed wheels 32. To the end of mounting the wheels 32 upon the cart, a rearwardly disposed mounting plate 34 is connected to the horizontal leg 18 of the bracket 12, in any suitable manner, as by a connecting means comprising the arrangements 20. Interiorly disposed bearing plates 36 are connected to the mounting plate 34 in any suitable manner, and extend in a generally vertical direction downwardly therefrom. A shaft 38 extends completely transversely of the cart or carriage 10 and is non-rotatably journalled within the bearing plate 34. Exterior bearings 40 of any suitable and well-known construction, fixedly and rotatably position the wheels 32 upon the shaft 38.

As pointed out above, the portable cleaning implement or apparatus 2 is manually propelled. To this end, there is provided a means for manually propelling the apparatus 2 comprising a curvilinear mounting or bracket plate 42, positioned upon and secured to the tank or container 4 in any suitable manner, as by welding. This plate has substantially the same rate of curvature as the tank 4 so that the former is positioned in a substantially flush relationship with the exterior or periphery of the latter. The mounting plate 42 is provided with ends 44, disposed in angular relationship with respect thereto and extending outwardly thereof. Each of the ends 44 has a bore (not shown) extending therethrough. Mounting or positioning hooks 46 having reverted or U-shaped segments or portions 48 are particularly adapted to be mutually cooperatively engageable with the ends 44. In this connection, the hooks 46 have threaded ends particularly adapted to extend through the bore in the ends 44 and mutually cooperatively engage a conventional nut 50. To manually propel the cart 10, there is provided a handle, generally designated by the reference character 52, of generally U-shaped configuration. The handle 52 comprises a plurality of generally vertically extending legs, generally designated by the reference character 54, having lower ends 56 particularly adapted to rest upon the mounting plate 34. Each of the legs 54 are comprised of a lower portion 58 and an upper portion 60 angularly disposed with respect to the lower portion. The upper portion extends in a generally rearwardly disposed direction of the cart 10 to facilitate gripping of the same and manual propelling of the cart. It is to be understood that the lower portion 58 of each of the legs 54 is particularly adapted to be positioned within the reverted segments 48 of the hooks 46 in abutting engagement with the ends 44 of the mounting plate 42. When the bolt 50 is run home upon the threaded end of the hook 46, the legs 54 and, thus, the handle 52, is drawn into a firm abutting relationship with the ends 44, thereby fixedly and securely positioning the same with respect to the plate 42. The handle 52 is gripped by a generally horizontally disposed leg 62, this being integral with each of the legs 54.

While the tank or container 4 is, as described above and illustrated in the drawings, particularly adapted to be structurally operatively associated with a cart, such as the cart 10, it is within the scope of this invention that the tank or container be used without such a cart and carried, manually or otherwise, to the point of use. For this purpose, the tank can be provided with a handle, or the like (not shown).

As pointed out above, the tank or container 10 is particularly adapted to be filled with or contain and dispense a suitable cleaning and/or washing fluid or fluids. To this end, there is provided a means for filling and for dispensing fluids from the tank comprising a filling and dispensing head, generally designated by the reference character 64, positioned or mounted upon the tank 10, and, specifically, the top wall 8 thereof. The top wall 8 is provided with an aperture 66 within which an annular mounting rim 68 is fixedly positioned, in any suitable manner, as by welding 70. The annular rim 68 is provided with interiorly threaded bores 72.

The filling and dispensing head 64 is comprised of an annular flange 76. This flange is provided with bores (not shown) positioned annularly thereabout for alignment with the bores 72. The head 64 is, therefore, particularly adapted to be positioned upon the rim 68 and secured with respect thereto in any suitable manner, as by means of threaded bolts (not shown) threadedly cooperating with the threaded bores 72 and the bores (not shown) positioned about and extending through the flange 76. Preferably, a conventional nut 78 is used for running home the bolt and for positioning the flange 76, and, thus, the head 64 in a firm abutting relationship with respect to the rim 68.

The body 74 is provided with a bore 80 disposed centrally thereof and extending completely longitudinally therethrough. The lower end 82 of the body 74 is radially outwardly chamfered and interiorly threaded for mutual cooperative engagement with the upper end of a filling conduit or inlet 84, fabricated of any suitable material, which conduit extends downwardly into the tank or container 4, as particularly illustrated in FIGURE 1, for a purpose to be more fully described hereinafter. An inlet port 86, positioned within and extending through the flange 76, communicates with the bore 84. One end 88 of the bore 86 is interiorly threaded for mutual cooperative engagement with an inlet conduit, to be described more fully hereinafter. An outlet port 89 is positioned within and extends through the flange 76. Similarly, with respect to the inlet port 86, an end 90 of the outlet port is interiorly threaded for mutual cooperative engagement with an outlet conduit, also to be more fully described hereinafter.

The flange 76 is comprised of a boss 92 having a threaded bore 94 particularly adapted to be mutually cooperatively engageable with a dispensing conduit 96. The dispensing conduit 96 may be fabricated of any suitable material, and extends downwardly into the tank or container 4, terminating substantially adjacent the bottom wall 6, as illustrated in FIGURE 1.

Still further, the filling and dispensing head 64 comprises a cap 98 of generally conical configuration. The cap is interiorly threaded, as indicated by the reference character 7, for mutual cooperative engagement with threads 9 positioned exteriorly of the body 74, whereby the cap may be securely positioned upon the body. The cap 98 is provided with flanges 11 extending outwardly thereof to facilitate grasping or gripping of the same in positioning the cap with respect to the body 74.

The upper end of the body 74 is chamfered, as indicated at 13, to provide an annular passage between the body and the cap 98. The extent of the chamfer is such as to position the lower end thereof substantially adjacent the upper wall of a groove 15, which groove is positioned interiorly of the cap 98, and completely annularly thereabout. A sealing ring 19, fabricated of any suitable material, and which may be of any well-known construction, is positioned within the groove 15, and cooperates with the body 74 at the lower end of the chamfer 13 to preclude the escape of any fluid within the tank or container 4.

To position the sealing ring 15 adjacent the lower end of the chamfer 13 and preclude the escape of fluid from within the tank, the body 74 is provided with an annular rim 17, which rim is particularly adapted to abuttingly engage the lower end of the cap 98 when the same has been completely run home upon the body 64 by means of the cooperative engagement between the threads 7 and the threads 9. Thus, as is considered readily apparent, the rim 17 defines a stop or a means for defining the limit of movement of the cap 98 upon the body 74 and downwardly with respect thereto.

It is desirable to provide the apparatus 2, constructed in accordance with the present invention, with a pressure release means or blow-off, when the cap 98 is to be removed from the body 74 for purposes of filling the container. To this end, in conjunction with the passageway disposed between the body 74 and cap 98, provided as a result of the chamfer 13, the cap is provided with an outlet port 21 positioned adjacent the groove 15 and in underlying relationship with respect thereto. Of course, the groove 15 and sealing ring 19 comprise a sealing means for the cap 98. In addition to the outlet port 21, a slot 23 is provided extending the body 74 at the upper end thereof, thereby defining a passage providing communication from the bore 80 to the atmosphere. This passage comprises the slot 23, the annular passage between the body 74 and the cap 98 defined by the chamfer, and the outlet port 21. It will be understood that communication between the bore 80 and the atmosphere is precluded when the cap is positioned completely upon the body with the lower end thereof in abutting relationship with the rim 17. However, as the cap 98 is removed from the body 74, a rotation of the former with respect to the latter, the above described passage is completed as soon as the sealing ring 19 moves away from the lower end of the chamfer 13 in an upwardly disposed direction.

A flexible inlet conduit 25, fabricated of any suitable material, is, as pointed out above, particularly adapted to be connected to the inlet port 86, as by means of the threaded end 88 thereof. A fitting 27 is provided at the end of the conduit 25, which fitting may be of any suitable and well known construction, and is particularly adapted to connect the conduit to a suitable source of pressurized fluid (not shown) such as a compressed gas. An on-off valve 29, of any suitable and well known construction, is positioned within the inlet conduit 25 to control the ingress of fluid to the container 4. A pressure gauge 31, of any suitable and well known construction, is also positioned within the conduit 25, whereby an operator is able to determine the pressure within the container. A flexible outlet conduit 33, which may be fabricated of any suitable material, such as a rubber hose, is particularly adapted, as pointed out above, to be connected to the outlet port 89 by means of the threaded end 90 thereof. A female coupling 35 is positioned upon the end of the conduit 33 for connection to the male fittings 5. This coupling 35 may be of any suitable and well known construction, and preferably and of necessity, is rotatable with respect to the conduit 33 whereby there will be no twisting of the conduit when connection is made to the fittings 5.

A valve, generally designated by the reference character 37, is positioned within the conduit 33 and is so constituted and arranged as to have an open position, in which flow of the cleaning fluid or fluids from within the tank or container 4 can take place therethrough and through the conduit, and a closed position, in which flow is precluded. The valve 37 is further so constituted and arranged as to be manually movable between these positions by means of a manual operator, such as push-button 49. As illustrated in the drawings, the valve 37 actually comprises a twin-valve assembly, wherein two similar valves are mounted in a single housing, each valve being operable by a corresponding one of a plurality of actuating buttons 49. In accordance with this construction, the housing would be provided with two inlets and an outlet, the conduit 33 being connected to one of the inlets and the outlet. The other inlet could be connected to an auxiliary hose (not shown), communication between such auxiliary hose and the conduit 33 between the outlet and the fitting 35 being had by manual operation of a corresponding one of the actuating buttons 49 and subsequent movement of a corresponding one of the twin valves within the valve 37 to its open position. The purpose and function of such an auxiliary hose and the twin-valve construction will be more fully described hereinafter.

A suitable indicia plate 39 is positioned upon the cap 98 and is secured thereto in any suitable manner, as by means of the threaded bolts 41. The cap 98 is suitably annularly bored for this purpose. If desired, an indicia plate 43 may also be positioned upon the tank or container 4. Should it be desired to drain the tank or container, a drain 45 is provided which may be of any suitable and well known construction.

The operation of the above described portable cleaning apparatus 2, constructed in accordance with the present invention, and the steps comprising the method developed in accordance herewith, are considered readily apparent. The tank or container 4 is first filled with a suitable cleaning or washing liquid, such as water, to the level indicated by the reference character 47. This is accomplished simply by removal of the cap 98 from the head 64. Subsequent thereto, the tank 4 is pressurized with a suitable fluid or gas under pressure, such as compressed air. This is accomplished simply by connecting the conduit 25 to a suitable source of pressurized fluid (not shown) and opening the valve 29. The pressurized fluid enters the tank by means of the bore 80 and the inlet 84. The gauge 31 will indicate to an operator when the tank is suitably pressurized. Once the tank is filled with liquid 47 and suitably pressurized, the conduit 25 may be stored by wrapping the same about suitable extensions 51 positioned upon and extending outwardly of the handle 52.

If the tank is to be used in conjunction with the cart 10, then the same is manually propelled to a position near the material feeder 2. As pointed out above, however, the tank or container 4 can be used without the cart 10, in which the same is carried or otherwise translated to a position adjacent the feeder. By means of the female coupling 35, the apparatus 2 is readily structurally operatively associated with the material feeder 1, the coupling 35 being run home with respect to the male fittings 5. As pointed out above, the male fittings 5 are so constituted and arranged as to provide a passageway to the internal or interiors of the visualizing means 3, whereby the same may be thoroughly cleaned. To dispense the cleaning liquid 47 from the tank 4, it is necessary merely to move the valve 37 to its open position by manually operating the push-button 49. The pressurized fluid within the tank 4 will force the cleaning liquid 47 into the conduit 33 by way of the outlet conduit 96 and the outlet port 88.

Once the contents of the tank or container 4 are completely dispensed, and it is desired to replenish the supply of the same therewithin, it is necessary merely to remove the cap 98 from the body 74 of the filling and dispensing head 64. This is accomplished merely by grasping flanges 11 and rotatably removing the cap 98 from the body 74. As the sealing ring 19 passes the lower end of the chamfer 13, a passage is completed, as described above, from the bore 80, through the outlet port 21 and to the atmosphere. It is to be understood that this passage is completed before the threads 7 and 9 are completely disengaged. In this manner, pressure within the tank 4 is released and harmful effects to an operator are precluded. Once the cap 98 is completely removed from the body 74, replenishing of the supply of cleaning liquid 47 within the tank 4 is easily accomplished.

As pointed out above, the tank or container 4, and all of the component parts and elements structurally associated therewith, can be used with or without the cart or carriage 10. When it is desired to use the tank without the cart 10, and should the tank previously have been structurally operatively associated therewith, the same is removed therefrom merely by releasing the handle 52 from the mounting or bracket plate 42. It is within the scope of this invention to consider this arrangement as another method of replenishing the supply of contents within the tank 4. Thus, when the tank is to be used with the cart 10, that the contents thereof have been completely dispensed, the same is removed from the cart and a new tank completely filled positioned thereupon. And, when the tank 4 is to be used with the cart 10, but certain of the component parts operatively associated therewith require repair, the tank and its component parts, comprising a unit, need merely be removed from the cart and replaced with a new unit.

After reading the foregoing detailed description of the preferred and illustrative apparatus of the present invention, it will be understood that the objects set forth at the outset of this specification have been successfully achieved. Additionally, while certain specific embodiments of the present invention have been described and illustrated, it is to be understood that many and diverse modifications thereof are possible. The present invention, therefore, is not to be restricted except insofar as is necessitated by the prior art and by the spirit of the appended claims.

What is claimed is:

1. A portable cleaning apparatus comprising in combination: a container; means for introducing and dispensing suitable cleaning fluids to and from said container, said introducing and dispensing means comprising: a body, said body having: an inlet port and an outlet port; a cap particularly adapted to be rotatably mutually cooperatively engageable with said body; sealing means positioned within said cap for sealingly engaging said body; means for defining the limit of movement of said cap upon and with respect to said body; means providing a pressure release for and from within said container, said pressure release means comprising: an annular passage disposed between an end of said body and said cap, said end being chamfered completely annularly about said body to define said passage, a slot extending through said body at said end, an outlet port extending through said cap and being positioned substantially adjacent the said sealing means and in underlying relationship with respect thereto, the extent of said chamfer being such as to position a lower end of said annular passage substantially adjacent said sealing means and in overlying relationship therewith when said cap mutually cooperatively engages said limit means, whereby an escape of fluid from said container and a body of said filling and dispensing head is precluded when the cap is completely positioned upon and with respect to said body, and whereby a passage is defined from within said body to the atmosphere comprising the slot, the annular passage and the outlet port of said cap when the cap has been rotatably moved with respect to said body to such an extent as to position the lower end of said annular passage substantially adjacent and in underlying relationship with respect to said sealing means; an inlet conduit connected to said inlet port; at least one flexible outlet conduit connected to said outlet port; and valve means positioned within said outlet conduit, said valve means having an open position providing communication through said outlet conduit and a closed position precluding the flow of fluids therethrough.

2. In the assembly as defined in claim 1, wherein:
   another flexible conduit is positioned and extends between the filling and dispensing means and said valve means, said valve means comprising:
   a plurality of similar valves positioned within a common housing, and
   an actuator for each of said valves, whereby, upon actuation of one of said plurality of valves, a first cleaning fluid is particularly adapted to be dispensed from said container and, upon actuation of another of said plurality of valves, another drying fluid is particularly adapted to be dispensed from said container.

References Cited by the Examiner

UNITED STATES PATENTS

| | | | |
|---|---|---|---|
| 539,295 | 5/1895 | Pierson | 214—18 |
| 891,911 | 6/1908 | Cooperider | 293—373 |
| 1,178,518 | 4/1916 | Hinkey | 214—18 |
| 1,276,659 | 8/1918 | Jensen | 134—30 |
| 1,764,387 | 6/1930 | Buchet | 134—102 X |
| 2,255,493 | 9/1941 | Pfalzgraff | 134—30 |
| 2,378,426 | 6/1945 | Myers | 239—373 |
| 2,726,667 | 12/1955 | Wigmore | 134—102 |
| 2,751,123 | 6/1956 | Kuhles | 222—176 |
| 2,842,465 | 7/1958 | Harrison | 239—373 X |
| 2,887,181 | 5/1959 | Dillon | 239—373 X |

CHARLES A. WILLMUTH, *Primary Examiner.*

GEORGE J. NORTH, *Examiner.*